May 17, 1938. S. SCHILLER Re. 20,731

REFLECTING UNIT

Original Filed Sept. 19, 1930

INVENTOR
Sigge Schiller
BY
Mitchell & Burhart
ATTORNEYS.

Reissued May 17, 1938

Re. 20,731

UNITED STATES PATENT OFFICE 20,731

REFLECTING UNIT

Sigge Schiller, Elizabeth, N. J., assignor to Traffic Signs & Signals, Inc., Paterson, N. J., a corporation of Delaware Original No. 1,903,385, dated April 4, 1933, Serial No. 483,023, September 19, 1930. Renewed February 13, 1933. Application for reissue April 1, 1935, Serial No. 14,140

5 Claims. (Cl. 88—82)

This invention relates to light-reflecting units of the class for example, which are used in groups so as to form signs or warning notices. According to the preferred form of my invention such a unit is formed so that in front-to-rear section its forward or refracting surface is convex and elliptical or substantially so and its reflecting surface comprises two stepped and laterally related portions so arranged that the relatively forward one reflects rays refracted by one portion of the refracting surface and the other reflects rays refracted by a portion of said refracting surface having a greater radius than the first portion thereof. The object of this construction may be stated briefly as follows: Of course by forming the refracting surface elliptical and arranging the two surfaces so as to bring to a focus on the reflecting surface the rays from a light source located substantially straight ahead of or in axial alinement with the apex of its ellipse, the reflecting power of the unit will be greater straight ahead than if the refracting surface is spherical; in other words, in the straight-ahead direction the intensity of the reflected ray-pencil will be greater in the former case than in the latter. But if it is attempted to obtain from such a unit (as by forming its reflecting surface spherical) reflection of rays emanating from a light source not in such axial alinement, or not straight ahead, there results a loss of reflecting power from such a unit in the direction of a light source so located, and this loss increases rapidly the further the light-source is thus removed, although if the refracting surface were also spherical no such loss, or practically none, would ensue. What I aim to accomplish by my invention, therefore, is to obtain that greater intensity of reflection straight ahead which characterizes an elliptical as compared with a spherical refracting surface and an appreciable lessening of the mentioned loss attendant on the positioning of the light source so that its rays are more or less angularly related to the longitudinal axis of the elliptical refracting surface. For example, by my invention, a unit or "button" say in a warning sign at the roadside will reflect light from an approaching headlight straight ahead to a greater distance than a unit having a spherical refracting surface, and it will remain well visible as the vehicle approaches and consequently assumes some position which is angularly related to the longitudinal axis of the elliptical surface of the unit, i. e., in which the vehicle has departed from the straight-ahead position. Other advantages flow from my invention, due principally to the use of an elliptical refracting surface, as that the whole lens is illuminated rather than a central portion thereof as in the case of a spherical lens and that as viewed from an angular position a greater area of illumination is presented.

Figure 11:
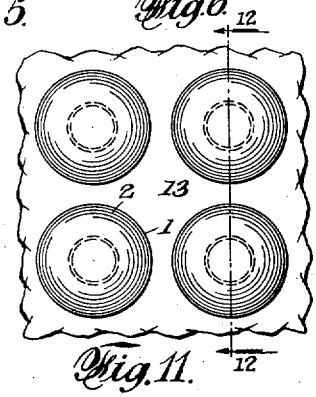
Fig. 11 is a fragmentary front elevation.
Figure 12:
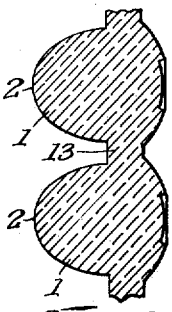

Fig. 12 a section on line 12—12 of Fig. 11, of a tile embodying a number of the units.

Figure 7:
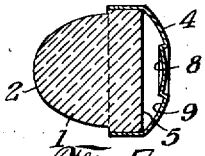
Figure 8:
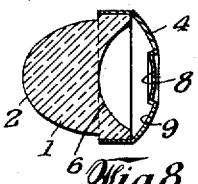
Figure 9:
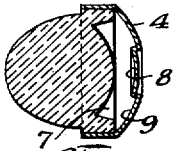

The lens 1 in Figs. 1 to 5 has a convex frontal refracting surface 2 which is elliptical or substantially so, with the apex of the ellipse forward. At the back is the reflecting surface or medium; this may be produced by silvering the back surface of the lens itself as at 3. Or it may be the front reflecting surface of a disk 4 pressed into cap-like form and fitted and secured in some way over the back portion of the lens, as in Figs. 6 to 9. In Figs. 1 to 6 the back surface of the lens and the reflecting surface are in face to face contact throughout with each other, but this is not indispensable as shown by Figs. 7 to 9 and when they are thus not so the back of the lens may be variously shaped as planiform at 5, Fig. 7, or hollowed in some way, as at 6 and 7, Figs. 8 and 9 as required for economy in molding the glass of which the lens is formed and other conditions.

Figure 1:
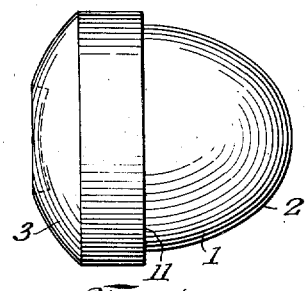
Figs. 1 and 2 are side and front elevations of a unit embodying the invention.
Figure 2:
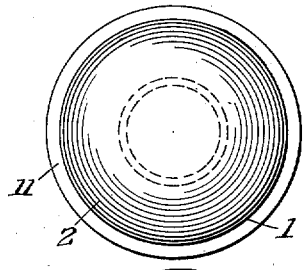
Figure 3:
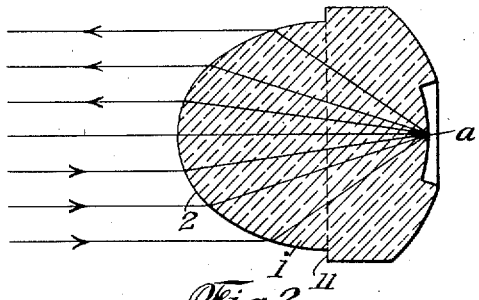
Figs. 3 and 4 are longitudinal sections of the lens, the arrow lines indicating diagrammatically the incoming and outgoing rays.

The reflecting surface or medium is formed in part with a central portion 8 properly distanced from the front of the lens so as to coincide with the ideal focus *a* (or that point in the focal line of the lens of maximum focal concentration of the rays, and which portion is here and preferably circular in front elevation—see dotted lines, Fig. 2—and has its center concident with the focal line or with the longitudinal axial line of the lens) and in part with a portion 9 flanking or lateral of the portion 8 and here surrounding or outwardly concentric thereto and stepped back with reference thereto. Such portions 8 and 9 are here further concave and conform substantially to spheres.

Figure 4:
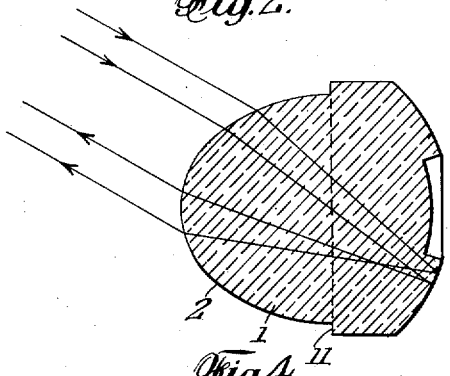

The unit so formed will have a definite reflecting power or intensity straight ahead with respect to a light source located straight ahead or substantially in the longitudinal axial line of the lens, and of course greater than if the unit presented a spherical refracting surface. Without the stepping or portions of the reflecting surface or medium on movement of the light source to a position angularly related to said axis there would result a loss of reflective power which, if carried to the extreme, would render the unit practically invisible upon the extreme movement, and this regardless of the radial distance the light source is from the unit; this is of course because the distance of the ideal focus from the refracting surface has increased due to the gradual increase in radius of the refracting surface from front to rear. But with the stepping, under the same conditions this difficulty is overcome and as illustrated by Fig. 4 the unit is effective to reflect light coming from a light source appreciably offset from the axial line of the unit. But without the step in the reflector, the advantages of the lens having the convex and substantially elliptical refracting surface will be realized but to a lesser degree.

As indicated, whereas it is preferable that the unit have the portion 9 actually surrounding the portion 8 and consequently the refracting surface 2 developed clear around the longitudinal axis in the section of an ellipse the invention is not limited to this detail which makes the unit useful in reflecting light coming from a light source angularly related to the axis of the unit and located in any position around said axis, as above or below or at one side or the other thereof.

Figure 10:
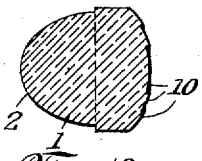
Fig. 10 shows a similar section of a unit of the pluristep type.
Figure 5:
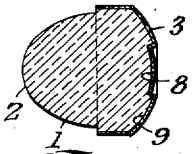
Fig. 5 is a longitudinal sectional view of said unit on a smaller scale.
Figure 6:
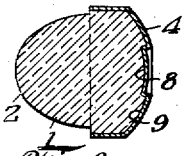
Figs. 6 to 9 show different forms which the units may take, these all being of the one-step type.

The unit may have of course more than two of the stepped surfaces as indicated by Fig. 10 at 10, which shows a lens with three surfaces stepped in the same relation as already described and which in this particular example is adapted to have silvering applied to its said surface, as in Fig. 5.

If the units are to be fitted into holes in a plate or the like of a sign it will be desirable to form them each with a circumferential stop or shoulder 11 to abut the plate.

But the lenses may be cast all in one piece, as shown by Figs. 11 and 12, where at their bases or greatest transverse diameters they are integral with a common plate of glass or equivalent transparent material 13.

Having thus fully described my invention what I claim is:

1. A reflecting unit including, with a lens having a convex and substantially elliptical refracting surface, a reflecting medium back of said surface having a portion thereof arranged and formed to reflect rays refracted by one portion of said surface and another portion thereof set relatively back and lateral of its first portion and arranged and formed to reflect rays refracted by a portion of said surface having a greater radius than the first-named portion of said surface.

2. A reflecting unit including, with a lens having a convex and substantially elliptical refracting surface whose longitudinal axis extends from front to rear of the unit, a reflecting medium back of said surface having a portion thereof arranged and formed to reflect rays refracted by one portion of said surface and another portion thereof set relatively back and lateral of the first portion and arranged and formed to reflect rays refracted by a portion of said surface having a greater radius than the first-named portion of said surface.

3. A reflecting unit including, with a lens having a convex and substantially elliptical refracting surface whose longitudinal axis extends from front to rear of the unit, a reflecting medium back of said surface having a portion thereof arranged and formed to reflect rays refracted by the substantially central forward portion of said surface and another portion thereof set back of and surrounding the first portion and arranged and formed to reflect rays refracted by the circumferential portion of said surface back of its said central forward portion.

4. A reflecting unit including, with a lens having a convex and substantially elliptical refracting surface, a reflecting medium back of said surface having a portion thereof arranged to reflect rays refracted by one portion of said surface and another portion thereof lateral of its first portion and arranged to reflect rays refracted by a portion of said surface having a greater radius than the first-named portion of said surface.

5. A reflecting unit including a lens having a convex and substantially elliptical refracting surface, a reflector in rear of said refracting surface and having a central portion positioned substantially at the focus of incident rays parallel to the axis of said lens, and a marginal portion positioned substantially at the focus of parallel rays entering the marginal portion of said lens and inclined to the axis thereof.

SIGGE SCHILLER.